June 5, 1934.　　　　C. GRUNSKY　　　　1,961,350
FLUID PROPORTIONING DEVICE
Filed Oct. 13, 1930
Fig. 1
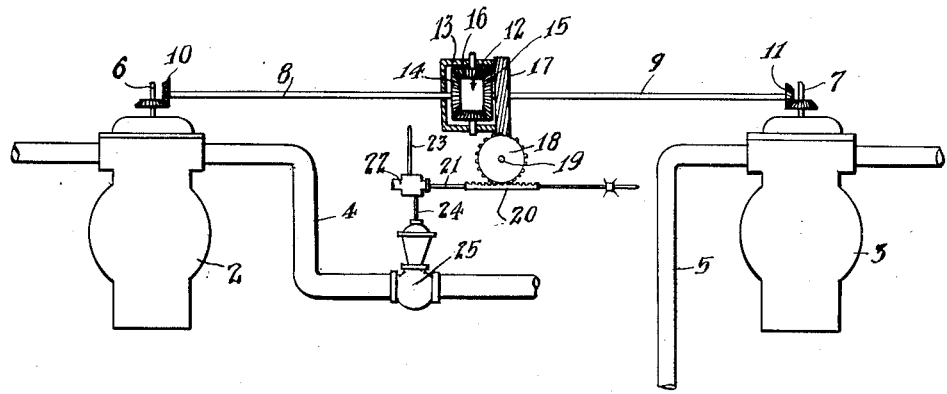
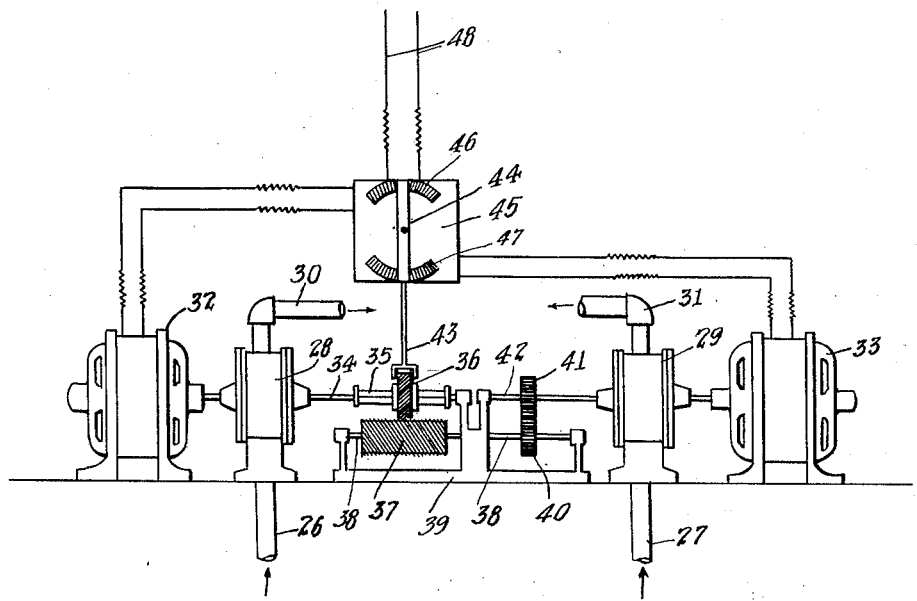
Fig. 2
Inventor
Charles Grunsky
By Lyon & Lyon
Attorneys Patented June 5, 1934

1,961,350

UNITED STATES PATENT OFFICE 1,961,350

FLUID PROPORTIONING DEVICE

Charles Grunsky, San Francisco, Calif.

Application October 13, 1930, Serial No. 488,371

1 Claim. (Cl. 137—164)

This invention relates to a device for controlling the flow of fluids in a plurality of pipe lines or conduits whereby proportional flow may be maintained through such conduits.

This invention also relates to devices for proportioning fluids in fixed ratio to each other and is particularly adapted to devices for supplying fluids in certain relative proportions. Devices embraced by this invention are particularly adapted for use whenever it is desired to mix liquids or gases in definite proportions, as in the manufacture of fuel gas from hydrocarbon vapors and air.

Heretofore various types of devices have been provided for maintaining proportionate rates of flow in pipe lines in which fluid pressure is utilized. For example, diaphragm operated valves have been placed in a pipe line in communication with one side of the diaphragm and another pipe line placed in communication with the other side of the diaphragm. While the pressure in the two lines remains constant, there is no movement of the diaphragm but any differential pressure causes the diaphragm operated valve to open or close, as the case may be, thus tending to bring the flow in the two pipe lines into equilibrium.

Another method which has been disclosed heretofore utilizes the flow rates of two pipe lines to maintain a constant ratio. In this method liquid flows from the respective pipe lines into balanced containers and as long as the proportional rates of flow remain constant, there is no movement of the balance. However, if for any cause the rate of flow in one line should increase or decrease without a corresponding change in the other, the containers are thrown out of balance and the resultant movement of the beam supporting the containers actuates a valve or valves to reduce the flow in the line running in excess or to increase the flow in the line through which the flow has been reduced, or both. In any event, the ratio of the two flows is brought back to the original and the balance is restored.

It is an object of the present invention to disclose and provide means for maintaining constant ratio between the flow rates in two or more pipe lines, such means being responsive to any variation in such predetermined and desired ratio.

Another object of the invention is to disclose and provide means utilizing the rates of flow in pipe lines for controlling and maintaining proportional flow of fluids in pipe lines, the control being effective within predetermined limits.

Another object is to disclose and provide means for maintaining constant proportional flow in a plurality of pipe lines, the means cooperating with customary types of meters or displacement pumps used in such lines, the means being actuated by the motion of the meters or displacement pumps.

A still further object is to disclose and provide means which employ the differential motion between measuring devices in a plurality of pipe lines in regulating the flow of fluids to said measuring devices.

Another object is to disclose and provide a device adapted to maintain a constant flow ratio, said device being responsive to the differential speeds of apparatus positioned in a plurality of pipe lines through which the constant flow ratio is to be maintained.

Another object is to disclose and provide simple and effective means of supplying fluids in fixed ratio to each other.

Other objects, uses and advantages of this invention will become apparent from the following description of typical embodiments of the invention, it being understood that the specific devices described hereinafter are merely illustrative of certain forms of the invention and do not limit the same to the particular constructions set forth.

In describing the invention, reference will be had to the appended drawing, in which:

Fig. 1 diagrammatically represents an arrangement of elements in which the proportional flow may be maintained through two lines equipped with metering devices.

Fig. 2 diagrammatically illustrates a modified form of the invention in which proportional flows may be maintained in pipe lines provided with pumps.

As shown in Fig. 1, 2 and 3 represent meters in pipe lines 4 and 5 respectively. The meters 2 and 3 may be of any form wherein the rate of flow through the meter is or may be transposed or translated into rotary motion. For example, the meters 2 and 3 may be provided with indicating mechanism or with shafts 6 and 7 adapted to operate an indicating mechanism, said shafts 6 and 7 rotating by reason of the flow of fluid through the lines 4 and 5 and through the meters 2 and 3 respectively. The shafts 6 and 7 may be connected through suitable gearing with shafts 8 and 9. For purposes of illustration, miter gears 10 and 11 are shown. The gearing between the shafts 6 and 8, and 7 and 9, such as the gearing 10 and 11 respectively, is preferably so designed as to cause the shafts 8 and 9 to rotate at the same speed and in opposite direction when the flow through the meters 2 and 3 is correctly proportioned.

The shafts 8 and 9 lead to a differential gear assembly generally indicated at 12 similar to the well known differential such as is used in an automobile and including a housing 13. The miter gears 14 and 15 are preferably connected to the ends of shafts 8 and 9 respectively whereas the sun gears 16 are journaled to the housing 13. The housing 13 may also carry a worm gear 17 adapted to engage a spur gear 18 mounted on a shaft 19. The rotary motion of the spur gear 18 is preferably translated into a linear motion adapted to operate a valve or valve controlling mechanism adapted to restore proportional flow in one or more of the lines through which the fluid is being passed. For example, the spur gear 18 may engage a movable rack 20, said rack 20 being connected as by means of a member 21 with an air valve assembly 22 controlling the flow of compressed air or gas from a source not shown, through an air inlet line 23 into line 24 to a diaphragm actuated control valve 25 in the line 4.

As stated hereinabove, suitable gear trains such as 10 and 11 are installed between the meters 2 and 3 and shafts 8 and 9 so that the shafts 8 and 9 rotate at the same speed when the meters 2 and 3 are operating at the desired proportional rate.

While the two shafts 8 and 9 continue to rotate at like speeds the differential housing 13 remains stationary but when one of the shafts 8 or 9 revolves faster or slower than the other (due to change of flow ratio through the respective meter) the housing itself tends to revolve about the shafts 8 and 9 as an axis. The movement of the housing 13 necessarily causes movement of the worm gear 17, the motion of the latter being transmitted to the rack 20 by means of the spur gear 18. The horizontal or linear motion of the rack 20 thus operates the air valve 22 so that more or less air pressure (as the case may be) is supplied to the diaphragm operated valve 25 whereby the flow in the pipe line 4 is reduced or increased and the speed of the shaft 8 brought back to the origonal relationship with that of shaft 9.

Obviously, the rack 20 could be connected to another diaphragm operated valve in pipe line 5 so that when the valve 25 is open the valve in line 5 would be reduced, thus making the device more sensitive to minor changes. It is also apparent that the pipe line valves could be mechanically operated by the worm gear 17 through any suitable arrangement of gears and levers without departing from the spirit of the invention.

Furthermore, instead of the worm gear 17 operating an air valve, such as the valve 22, the motion of the worm gear 17 may be translated into a desired motion of a suitable valve in the line 4 and/or in the line 5.

As shown in Fig. 2, the fluids being proportioned may be supplied by lines 26 and 27 to pumps 28 and 29 respectively and discharge therefrom by means of lines 30 and 31. The pumps 28 and 29 may be either of the rotary type, displacement type or any other type where the motion is substantially proportional to the flow therethru and in which the motion thereof may be transmitted as rotary motion to a shaft. The pumps 28 and 29 are shown as being direct connected to electrical motors 32 and 33. The pump 28 may be provided with an extended shaft 34 held in suitable bearings (not shown) and having a squared section 35 for part of its length.

A worm gear 36 may be slidably carried on the squared portion 35 of the shaft 34. In place of the squared section 35 the shaft 34 may be cylindrical with an elongated key seat adapted to engage a corresponding key in the worm gear 36 so that the worm gear 36 is capable of horizontal movement but not rotation on the shaft 34. The worm gear 36 may be placed in operated relation with a worm gear 37 mounted on a shaft 38 journaled in a frame 39. The shaft 38 may also carry a spur gear 40.

The spur gear 40 may engage another spur gear 41 mounted on an extension of the shaft 42 of the pump 29.

Adjacent to the worm gear 36 may be a fork member 43, the prongs of which being in slidable engagement with the sides of the worm gear 36, the fork member may be pivotally connected as at 44 to a rheostat 45 having control banks 46 and 47 by means of which electrical current supply from a source represented by the leads 48 may be controlled to the motors 32 and 33.

In operation the system is first adjusted by suitable gear combinations, motor and pump sizes and rheostat regulation so that the worm gears 36 and 37 revolve at the same speed when the pumps 28 and 29 are discharging at the desired proportional rate. As long as this desired ratio is maintained, the worm gears 36 and 37 will revolve together but without change in their horizontal relationship. If, however, due to changes in pressure in the respective lines, changes in relative density or viscosity of the liquids being pumped, or other causes, one of the pumps moves faster or slower than the predetermined ratio calls for, then the worm gear 36 will tend to move horizontally on the squared portion 35 of the shaft extension 34. This horizontal movement of the worm gear 36 causes the fork 43 to pivot at 44, thus changing the resistance of the rheostat 45 whereby more or less electric current, as the case may be, is supplied to the respective motors and the original proportional rate of ratio is restored.

Another arrangement similar to that shown in Fig. 2 may also be employed in a slightly different manner. For example, the rheostat 45 might be connected to electrically operated valves in either or both of the lines 26 and 27 or the fork member 43 may actuate a compressed air valve assembly for diaphragm operated valves in the lines or the fork member 43 or any other equivalent device for transmitting the horizontal movement of the worm gear 36 could be directly connected to valves in one or more lines.

It is thus seen that the invention contemplates a simple arrangement of elements whereby proportional flow may be controlled and maintained through a plurality of lines provided either with pumps, meters, or other devices adapted to exhibit rotary motion variable with rate of flow through said devices.

While specific methods of the invention have been described and illustrated, it is to be understood that the invention is not limited to such devices but is intended to embrace all variations, modifications and substitutions wherein the differential movement of apparatus responsive to flow rates in a plurality of pipe lines are utilized to maintain a predetermined and constant flow ratio. All such changes and modifications as come within the scope of the appended claim are therefore embraced thereby.

I claim:

In a device for maintaining proportional flow of fluids in pipe lines, the combination of a plurality of fluid conduits, a motor driven pump in each of said conduits, a shaft driven by each of said motor driven pumps, and a motor regulating device, including a differential, actuated by variation in relative motion of said driven shafts from a predetermined ratio, said motor regulating device being operably connected to one of said motor driven pumps to control said pump.

CHARLES GRUNSKY.